May 16, 1961

J. M. WALLACE 2,984,816

ELECTRICAL CONNECTOR

Filed Feb. 2, 1959

2 Sheets-Sheet 1

JOSEPH M. WALLACE,
INVENTOR.

BY Frederic B. Schramm

ATTORNEY.

May 16, 1961 J. M. WALLACE 2,984,816

ELECTRICAL CONNECTOR

Filed Feb. 2, 1959 2 Sheets-Sheet 2

JOSEPH M. WALLACE,
INVENTOR.

BY Frederic B. Schramm

ATTORNEY.

2,984,816

ELECTRICAL CONNECTOR

Joseph M. Wallace, Los Angeles, Calif. (5617 Corryne Place, Culver City, Calif.)

Filed Feb. 2, 1959, Ser. No. 790,479

5 Claims. (Cl. 339—94)

This invention relates to electrical connectors and concerns particularly terminal block assemblies.

An object of the invention is to provide a terminal block which may be produced economically and accurately with terminals very precisely located and well insulated.

A further object of the invention is to provide terminal block assemblies which are very compact, of small size and weight and of the utmost reliability so as to be fail proof.

Still another object of the invention is to provide a terminal block assembly having a plurality of terminals with all leads coming off from the terminals in the same direction or any combination thereof.

Still another object of the invention is to provide a terminal block assembly which provides for support of terminals and leads in a mold while the insulating mounting block is being molded so that the leads or conductors may be molded in place with the terminals and sealed within the insulating block.

Still another object of the invention is to provide an improved method of molding terminals and conductors in position in a molded insulator block precisely located so that dielectric strength may be specified exactly.

Other and further objects, features and advantages of the invention will become apparent as the description proceeds.

In carrying out the invention in accordance with a preferred form thereof a plurality of terminals for an electrical connector are mounted within a molded connector block or insulator with the leads or connecting conductors also molded within and supported within the insulator block. In forming the block and mounting the terminals and leads therein, metallic terminals are employed which have center holes therein and a jig is provided having locating pins which occupy the holes in the terminals to locate them laterally as well as lineally during the molding operation. Each of the terminals has openings passing through the sides thereof transversely to the axis of the locating pin receiving holes. The leads are of metallic wire having suitable dielectric coatings of insulation such as plastic insulation and extend lengthwise from one end of the cavity of the mold through the transverse holes in the terminal located at one end of the mold cavity, whereby the leads and the terminal in question are supported in the mold cavity. One of the leads is soldered to the end terminal with the other leads extending through it to the next terminal to which one of the leads is soldered with the remaining leads extending through that terminal to the next terminal, and so on, so that all of the leads are well supported and the terminals are well supported in the mold cavity. In this manner an insulating block may effectively be molded into the mold cavity with the leads and terminals mounted therein.

The terminals have necks with undercut peripheries to receive gaskets such as silicone, or the like, bulging very slightly beyond the face of the terminal and the insulating block to give a good seal around each terminal which keeps out moisture and prevents leakage of air pressure. For the sake of increased compactness without loss of strength, the terminals are formed with square cross sections with portions of the corners milled off to give additional thickness of plastic of the insulating block thereby providing adequate strength with maximum compactness and minimum size of the assembly.

A better understanding of the invention will be afforded by the following detailed description considered in conjunction with the accompanying drawing in which Fig. 1 is a fragmentary perspective view of an airplane windshield or the like having a terminal block assembly secured thereto for making connections to an electrical device such as a windshield heater mounted in the windshield;

Figures 1, 2, 3, 4:
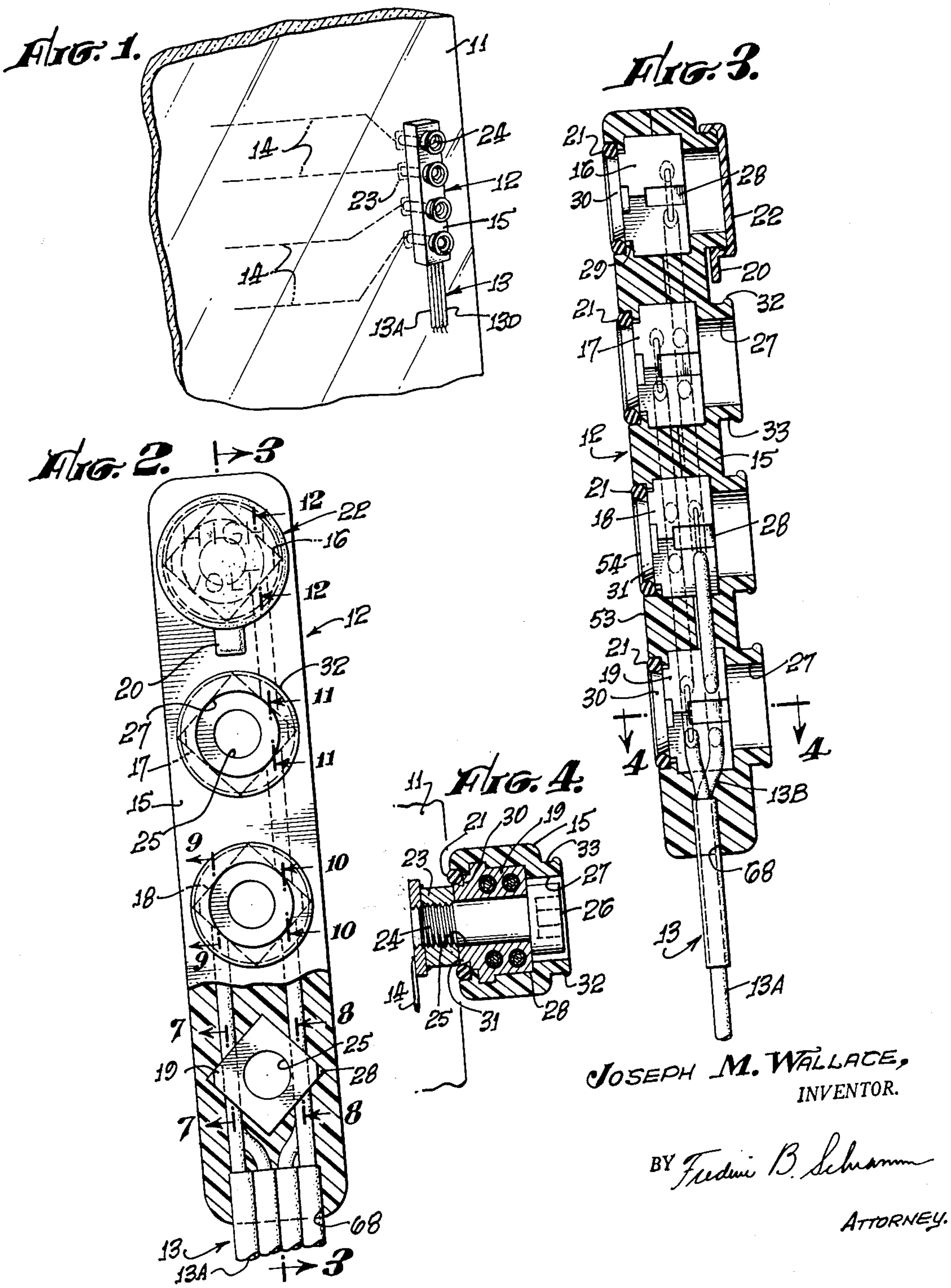
Fig. 2 is a plan view of the terminal block assembly of Fig. 1 with a portion thereof broken away, represented as cut by a longitudinal plane.
Fig. 3 is a view of a longitudinal vertical section of the assembly of Fig. 2 represented as cut by a plane 3—3 indicated in Fig. 2.
Fig. 4 is a view of a cross-section of the device of Fig. 3 represented as cut by a plane 4—4 indicated in Fig. 3 and illustrating also in section a nut plate set in a fragmentarily represented windshield.
Figure 6:
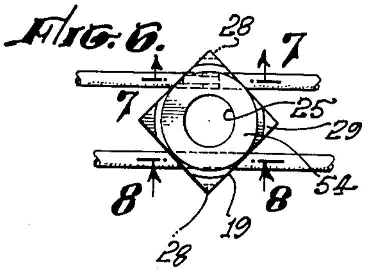
Fig. 6 is a fragmentary view of the assembly of Fig. 5 showing only one of the terminals and fragments of conductors supported therein.
Figure 7:
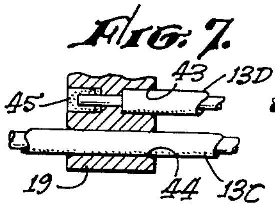
Figure 8:
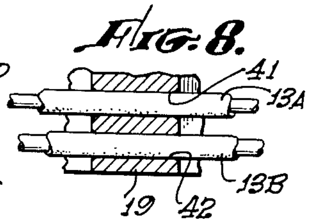
Figure 9:
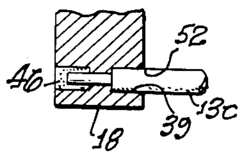
Figure 10:
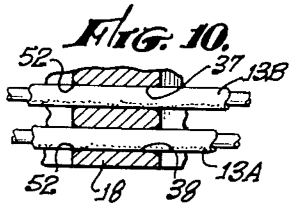
Figure 13:
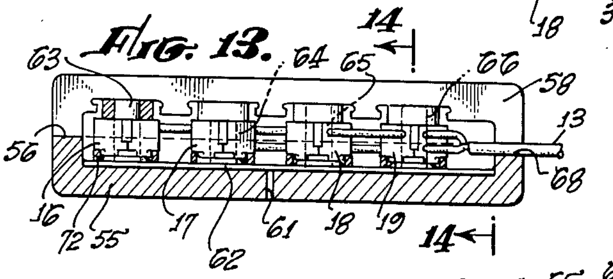
Figure 11:
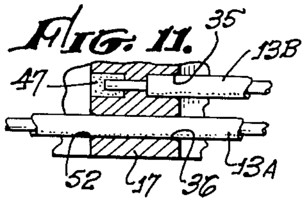
Figures 14, 15:
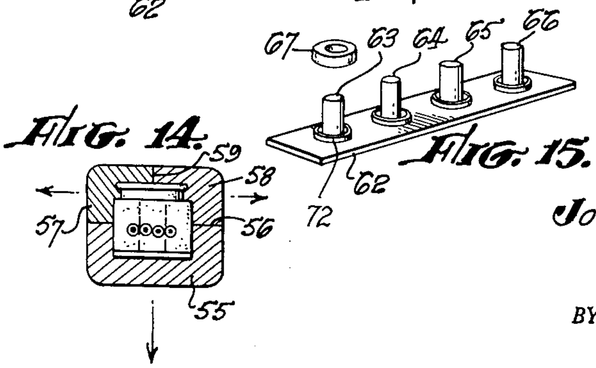
Figure 12:
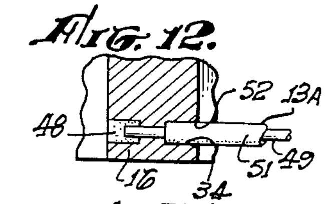

Fig. 7 is a view of a section of the apparatus of Fig. 6 represented as cut by a plane 7—7 illustrated in Figs. 2 and 6 and as seen looking in the direction of the arrows of Figs. 2 and 6;

Fig. 8 is a corresponding view of the apparatus of Fig. 6 represented as cut by a plane 8—8 indicated in Figs. 2 and 6 and as seen looking in the direction of the arrows;

Fig. 9 is a corresponding view of a section of another terminal represented as cut by a plane 9—9 indicated in Fig. 2;

Fig. 10 is a corresponding view of a section of a terminal represented as cut by a plane 10—10 indicated in Fig. 2;

Fig. 11 is a corresponding view represented as cut by a plane 11—11;

Fig. 12 is a corresponding view represented as cut by a plane 12—12;

Fig. 13 is a longitudinal sectional view of a mold employed in producing the device of Figs. 2 and 3;

Fig. 14 is a view of the cross-section of the mold of Fig. 13 represented as cut by a broken plane 14—14 indicated in Fig. 13;

Fig. 15 is perspective view of an insert plate or terminal locating jig for the mold of Figs. 13 and 14.

Like reference characters are utilized throughout the drawing to designate like parts.

Referring to the drawings a windshield 11 is fragmentarily represented in Fig. 1 and is shown having a connector or terminal block assembly 12 secured thereto. The connector 12 has conductors 13 connected thereto which are brought from a source of current (not shown) for making electrical connections to a current consuming device such as defroster heater wires 14.

The terminal block assembly 12 as illustrated in greater detail in Figs. 2 and 3 comprises a molded block of insulating material 15 in which terminals composed of a suitable metallic conductor such as brass have been molded. In the specific embodiment illustrated there are four terminals 16, 17, 18, and 19, shown at four positions in alignment marked positions A, B, C, and D respectively. The terminal block assembly includes gaskets 21 under each of the terminals 16 to 19 for overcoming seepage of moisture into the terminal block assembly and, if desired, insulating caps 22, only one of which is shown.

As illustrated in Figs. 1 and 4 the terminal block assembly 12 is designed for electrically and mechanically connecting the terminals 16–19 to a nut plate including electrically separate units 23 mounted in a suitable manner in the device such as the windshield 11; for example, by means of a Micarta insert molded in the windshield 11. For making the electrical and mechanical connection of the terminals to the nuts 23 of the nut plate, clamping screws 24 are provided which pass through center holes 25 in the terminals and have suitable heads 26 occupying recesses 27 in the insulating block 15. The heads 26 may be provided with suitable flat screw-eyes or may be recessed with hexagonal openings to receive the tip of a plug wrench if desired.

Figure 5:
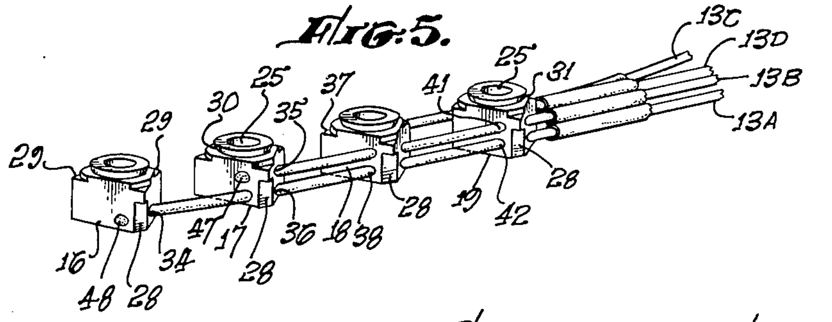
Fig. 5 is a perspective view of an assembly of conductors and terminals before molding in the insulated block shown in Figs. 1–4 represented as they would be seen looking from the bottom of the device of Fig. 2 or from the left of Fig. 3.

As illustrated more clearly in Fig. 5 the terminals 16 to 19 are composed of metal blocks of square cross-section mounted with diagonal corners in alignment. Corners of the square metal pieces are preferably cut off in order to provide greater strength in the plastic insulator block 15. For example, as illustrated in Fig. 5, in the specific embodiment illustrated, two opposite corners, viz., corners 28 toward the edges of the terminal block 15 are cut away in order to provide for adequate insulator plastic material at the sides of the insulator block 15. Four corners 29 near neck portions 30 may also be cut away as shown in Fig. 5 for the further strengthening of the assembly.

Each of the terminals 16—17 is formed with a neck portion 30 which is undercut around the periphery 31 for receiving the gaskets 21 which may be composed of a suitable resilient insulating sealing material such as silicone rubber, for example.

As shown in Figs. 3 and 4 the insulator block 15 is formed with beads 32 around neck portions 33 surrounding the recesses 27 for the screw head 26. The insulator caps 22 if employed are so formed of suitable plastic or resilient rubber-like material as to snap over the beads 32, being removable by means of tabs 20.

One of the features of the invention is the facilitation of the molding of the insulator around the metallic terminals 16–19 with the conductors 13 electrically connected to the terminals and with secure and rigid support of the terminals, the ends of the conductors and the intermediate portions of the conductors while the plastic insulating material of the insulator block 15 is setting. To this end, means to be described more fully hereinafter, are provided for securing the terminals 16–19 during molding and the terminals themselves serve as means for supporting the conductors 13.

In the particular embodiment illustrated having four terminals the conductor group 13 consists of four separate conductors 13A, 13B, 13C, and 13D. As illustrated in Fig. 5 and Fig. 12 the end terminal, that in the position A, supports only the end of the conductor 13A in an opening 34. The other terminals, 17, 18, and 19, however, are formed with openings for supporting the conductor 13A which continues on to the terminal 16 as well as supporting one or more other conductors as illustrated in Fig. 5. For example, as shown in Fig. 11 the terminal 17 has two openings 35 and 36, the former supporting the end of the conductor 13B and the latter supporting the conductor 13A.

In a similar manner, as shown in Figs. 9 and 10 the terminal 18 is provided with an opening 39 for supporting the end of the conductor 13C and openings 37 and 38 which support the conductors 13A and 13B, which continue on through the terminal 18 without making electrical contact therewith. The terminal 19 at the opposite end, the D position, toward the end where the conductors 13 are received has four openings for supporting all four conductors. As illustrated in Fig. 8 there are openings 41 and 42 in the terminal 19 through which the conductors 13A and 13B pass without making electrical contact with the terminal 19; and as shown in Fig. 7 there is an opening 43 supporting the end of the conductor 13D and also an opening 44 supporting the conductor 13C without making electrical contact therewith.

The ends of the conductors are electrically connected in a suitable manner to the terminals, for example, by means of filling the preferably counter bored openings around the end of the conductor with solder. As shown in Fig. 7, solder 45 electrically connects the bared end of the insulated conductor 13D to the terminal 19. Likewise as shown in Fig. 9 solder 46 electrically connects the bared end of the conductor 13C to the terminal 18 and in like manner solder 47 and 48 electrically connects the bared ends of the conductors 13B and 13A to the terminals 17 and 16 respectively. The counter bored openings serve to keep the insulation in place and protects the insulation from hot solder.

It will be understood that in order to prevent short-circuiting of the conductors they are coated or sheathed with suitable insulating material such as plastic or the like as shown in Figs. 7 to 12. Referring more specifically to Fig. 12, each conductor consists of a bare metal wire such as silvered copper 49, for example, surrounded by an insulating coat or sheath 51. Moreover to guard against the cutting of the insulating sheath 51 or abrasion thereof which may eventually lead to insulation breakdown, the insulation sheaths are protected by providing rounded or chamfered corners 52 in the openings 34, 35, 36, 37, 38, 39, 41, 42, 43, and 44.

In order to facilitate the securement of the connector or terminal block assembly to the nut plate the construction is such that the terminals and the insulator blocks 15 have co-planar faces. As shown in Fig. 3, the face or surface 53 of the insulator block 15 is co-planar with the faces 54 of the terminals. The faces 54 are silvered in order to make better electrical contact with the abutting surfaces of the nuts 23 in the nut plate in the windshield 11. The construction of the assembly and the shape of the terminals results in a relatively large cross-sectional area in the bottom of the terminal where it contacts the nut plate in order to provide very low resistance to the passage of electric current.

The invention is not limited to a particular method of forming the terminal assembly illustrated in the drawings; however, I have found that a practical and inexpensive manner of molding the conducting parts in the insulator block 15 may be carried out by employing a mold of the type illustrated in Figs. 13 and 14. The mold as illustrated has a bottom part 55 with a horizontal parting line 56 separating it from the upper portion, which in turn consists of two top parts 57 and 58 having a vertical parting line 59. A suitable sprue hole or opening for plastic injection 61 is provided at the side or end as preferred.

In order that the terminals 16–19 may be supported securely and accurately spaced from each other and from the edge of the terminal block, a jig or pin plate 62 is provided as illustrated in perspective in Fig. 15. The pin plate 62 carries integral therewith four pins or plug portions 63, 64, 65, and 66 for supporting the terminals 16, 17, 18, and 19, respectively, the pins passing through the center holes 25 of the terminals.

It will be understood that preparatory to molding one of the terminal block assemblies, the pin plate 62 is dropped into the bottom of the cavity of the mold portion 55. Then terminals 16–19 are placed on the pins 63–66. The conductors 13 are then brought into position being passed in turn through the various lateral openings such as 34, 35, 36, 37, 38, 39, 41, 42, 43, and 44. The soldered end connections are thereupon made, with the bundle of electrical conductors resting in an opening 68 in the end of the bottom mold portion 55. After the bared ends of the conductors have been soldered in place which gives further rigidity to the assembly, bushings 67 are set on the pins 63, 64, 65, and 66 above the terminals 16–19 for forming the circular recesses 27 which are to admit the screw heads 26. The upper mold parts 57 and 58 are then brought into position and the plastic which is preferably a polymerizable type of plastic such as polytetrafluoroethylene is injected. It will be understood that preferably annular bosses 72 are formed on the pin plate 62 around the pins 63–66 in order to form the recesses for receiving eventually the silicone gaskets 21.

After the plastic material has cured the mold is opened by first separating the top parts 57 and 58 sidewise and then lifting the bushings 67 and the pin plate 62 from the bottom part 55 after which the completed assembly is freed from the mold.

In electrically connecting the terminal block assembly to the nut plate in a windshield 11 or the like, the assembly is brought in position against the nut plate with the gaskets 21 serving to seal the joint against moisture or air pressure as desired. The screws 24 are inserted and tightened to bring the silvered faces 54 of the terminals in good electrical contact with the mating faces of the nut plate. There is no danger of cracking, distorting or injuring the windshield 11 or other apparatus to which the connection may be made owing to the fact that the terminals 16–19 have been very accurately aligned and located by the use of the jig or pin plate 62.

Moreover, because of the accurate spacing of the terminals, from the sides of the insulator block 15, the desired dielectric strength may be assured.

While the invention has been described as embodied in concrete form and as operating in a specific manner in accordance with the provisions of the Patent Statutes it should be understood that the invention is not limited thereto since various modifications will suggest themselves to those skilled in the art without departing from the spirit of the invention the scope of which is set forth in the annexed claims.

What is claimed is:

1. An electrical connector assembly comprising an insulator block, a plurality of terminals composed of electrically conducting material supported within said insulator block, the terminals having lateral openings at the sides thereof, said openings having axes extending in the direction of the length of the insulator block from one terminal to the next, and a plurality of insulated conductors extending in the same direction from one end of the insulator block toward the opposite end, one of said conductors being electrically joined to a terminal at the end of the insulator block from which the conductors enter the block, the remaining conductors extending through the lateral openings of said end terminal toward the remaining terminals, each of the conductors being electrically joined to a different one of the terminals and extending through lateral openings of the terminals which lie between the end of the insulator block from which the conductors enter and the terminal to which said conductor is electrically joined.

2. An electrical connector assembly as in claim 1 in which the lateral openings have rounded corners for protection of the insulated conductors.

3. An electrical connector assembly as in claim 1 wherein the terminals are of square cross-section with portions of corners cut off to provide space for additional insulating material to strengthen the insulator block.

4. An electrical connector assembly comprising in combination an insulator block composed of molded plastic, a plurality of terminals composed of electrically conducting material supported within said insulator block, the terminals having end faces substantially coplanar with a side surface of the insulator block with undercut necks at said faces, the insulator block being formed with annular recesses around said necks and yieldable gaskets received within said recesses of such dimensions as to bulge slightly from the faces of the terminals and the insulator block, the terminals having lateral openings at the sides thereof, said openings having axes extending in the direction of the length of the insulator block from one terminal to the next, and a plurality of insulated conductors extending in the same direction from one end of the insulator block toward the opposite end, one of said conductors being electrically joined to a terminal at the end of the insulator block from which the conductors enter the block, the remaining conductors extending through the lateral openings of said end terminal toward the remaining terminals, each of the conductors being electrically joined to a different one of the terminals and extending through lateral openings of the terminals which lie between the end of the insulator block from which the conductors enter and the terminal to which said conductor is electrically joined.

5. An electrical connector assembly comprising an insulator block, a plurality of terminals composed of electrically conducting material supported within said insulator block, the terminals having lateral openings at the sides thereof, said openings having axes extending in the direction of length of the insulator block from one terminal to the next, and a plurality of conductors extending in the same direction from one end of the insulator block toward the opposite end, each conductor resting in at least one of said lateral openings, each of said conductors being electrically joined to a different one of the terminals including a terminal at the end of the insulator block from which the conductors enter, any conductor other than the conductor electrically joined to said end terminal extending through one of the lateral openings therein, insulating sheathing in each of said lateral openings at each terminal in which a conductor rests surrounding such conductor other than the conductor electrically joined to such terminal, each conductor extending through the lateral opening of any terminal which lies beyond the end of the insulator block from which the conductors enter other than the terminal to which the conductor is electrically joined.

References Cited in the file of this patent

UNITED STATES PATENTS

| | | |
|---|---|---|
| 1,969,529 | Shafer | Aug. 7, 1934 |
| 2,653,178 | Ruffle | Sept. 22, 1953 |
| 2,701,871 | Rauch | Feb. 8, 1955 |